US012595825B2

(12) United States Patent
Grenzi et al.

(10) Patent No.: US 12,595,825 B2
(45) Date of Patent: Apr. 7, 2026

(54) DEVICE FOR MONITORING THE LUBRICATION CONDITION OF A BEARING OF A TRACK ROLLER OF A RUNNING GEAR OF A TRACKED VEHICLE

(71) Applicants: Berco S.p.A., Copparo/Ferrara (IT); thyssenkrupp AG, Essen (DE)

(72) Inventors: Francesco Grenzi, Ferrara (IT); Enrico Maggiolini, Ferrara (IT)

(73) Assignees: Berco S.p.A., Copparo/Ferrara (IT); thyssenkrupp AG, Essen (DE)

( * ) Notice: Subject to any disclaimer, the term of this patent is extended or adjusted under 35 U.S.C. 154(b) by 327 days.

(21) Appl. No.: 18/578,648

(22) PCT Filed: Jul. 7, 2022

(86) PCT No.: PCT/EP2022/068992
§ 371 (c)(1),
(2) Date: Jan. 11, 2024

(87) PCT Pub. No.: WO2023/285296
PCT Pub. Date: Jan. 19, 2023

(65) Prior Publication Data
US 2024/0328461 A1 Oct. 3, 2024

(30) Foreign Application Priority Data
Jul. 13, 2021 (EP) .................................... 21185441

(51) Int. Cl.
*F16C 41/00* (2006.01)
*B62D 55/15* (2006.01)

(52) U.S. Cl.
CPC ............ *F16C 41/008* (2013.01); *B62D 55/15* (2013.01); *F16C 2233/00* (2013.01)

(58) Field of Classification Search
CPC .. F16C 41/008; F16C 2233/00; F16C 13/006; F16C 41/00; F16C 2300/42;
(Continued)

(56) References Cited

U.S. PATENT DOCUMENTS

2013/0255354 A1* 10/2013 Hawkins ................. G01N 3/56
305/15

FOREIGN PATENT DOCUMENTS

CN 111 017 059 A 4/2020
CN 114981551 A * 8/2022 ............ F16C 19/525
(Continued)

OTHER PUBLICATIONS

English Translation of International Search Report issued in PCT/EP2022/068992, dated Oct. 3, 2022.

*Primary Examiner* — John E Breene
*Assistant Examiner* — Manuel Salvador Castellon, Jr.
(74) *Attorney, Agent, or Firm* — thyssenkrupp North America, LLC

(57) ABSTRACT

A device for monitoring the lubrication condition of the bearing of a track roller of a running gear of a tracked vehicle by means of temperature monitoring, wherein the track roller has at least one bearing journal, wherein the track roller is mounted in a frame of the tracked vehicle via the bearing journal, wherein a sensor arrangement is arranged in the region of the bearing journal, wherein the sensor arrangement is set up to transmit temperature data measured by the sensor arrangement wirelessly to a further processing device.

15 Claims, 4 Drawing Sheets

(58) Field of Classification Search
CPC .. F16C 2310/00; F16C 2326/20; B62D 55/15;
B62D 55/32; B60Y 2200/25
See application file for complete search history.

(56) References Cited

FOREIGN PATENT DOCUMENTS

| | | | |
|---|---|---|---|
| EP | 3 279 064 | A1 | 2/2018 |
| KR | 1020160123908 | A | 10/2016 |
| KR | 101826527 | B1 | 2/2018 |
| KR | 1020180019131 | A | 2/2018 |
| KR | 101919338 | B1 | 11/2018 |
| WO | 2013/148735 | A1 | 10/2013 |
| WO | 2021/105938 | A1 | 6/2021 |

* cited by examiner

DEVICE FOR MONITORING THE LUBRICATION CONDITION OF A BEARING OF A TRACK ROLLER OF A RUNNING GEAR OF A TRACKED VEHICLE

CROSS REFERENCE TO RELATED APPLICATIONS

This application is a U.S. National Stage Entry of International Patent Application Serial Number PCT/EP2022/068992, filed Jul. 7, 2022, which claims priority to European Patent Application No. EP 21 185 441.9, filed Jul. 13, 2021, the entire contents of both of which are incorporated herein by reference.

FIELD

The present disclosure generally relates to a device for monitoring the lubrication condition of the bearing of a track roller of a running gear of a tracked vehicle by means of temperature monitoring.

BACKGROUND

Such tracked vehicles can be vehicles for mining, construction, forestry, agriculture, landscaping, and material handling industries, for example heavy equipment for moving earth and other materials. hydraulic and electric excavators, backhoes, shovels, and drills. They are used at, for example, mining or construction sites. These track vehicles are heavy-duty equipment, some are capable of moving thousands of kilograms of material at a time. The drive system underneath such track vehicles includes a track-type undercarriage. A track undercarriage is used to move the heavy vehicle and large amounts of material over many types of terrain. Track undercarriages are intended to operate an a variety of terrain conditions and can handle a higher operating weight capacity than comparably sized wheeled assemblies.

A device for monitoring the lubrication condition of the bearing of a track roller is known from international patent application WO 2013/148735 A1 ("WO 735").

As explained in WO 735, the roller components and bearing bushings are ideally well lubricated and there is a low friction contact surface between the bearing bushing and the roller or between the bearing bushing and the shaft. Inadequate lubrication of the contact surfaces will increase friction between the bearing bushing and the roller, resulting in wear of the bearing bushing and eventually damage to the roller assembly. Even with adequate lubrication, bearing bushings will wear over time due to contact with the roller or shaft. Because bearing bushings and lubricant are inside the roller assembly, the wear condition of the bearing bushings and the amount of lubricant in the roller assembly are difficult to monitor.

According to WO 735, roller assemblies in a tracked vehicle chassis typically fail due to inadequate lubrication. Without adequate lubrication, friction between the roller and bearing bushing or bearing bushing and shaft increases significantly, causing component wear. One indicator of inadequate lubrication is increased heat within the roller assembly.

Without constant monitoring of the roller assemblies of a tracked vehicle running gear, lubrication problems go unnoticed and the bearing bushings tend to wear out completely before the wear is noticed. Then the rollers run without bearing bushings. When a bearing bushing is completely worn and the roller continues to run without a bearing bushing, damage to the roller occurs as the roller contacts other surfaces within the roller assembly. The "metal on metal" contact or "steel on steel" contact between the roller and other surfaces of the roller assembly will cause the surface of the roller and the surface of the other components to wear and deteriorate beyond the point to which the parts can still be repaired. Eventually, a roller or bearing bushing will wear and seize without lubricant.

The tracked vehicle then fails at the job site when a roller unexpectedly stops turning. Tracked vehicles that fail at the point of use during operation create additional hazards and maintenance problems and incur additional costs for repairs and replacements. However, if lubricant problems or bearing bushing wear are detected early, the affected roller assembly can be repaired or replaced in a timely and cost-effective manner (e.g., as part of scheduled maintenance) without causing the tracked vehicle to fail while on the job site.

In order to be able to detect a lack of lubricant and thus impending wear at an early stage, WO 735 proposes monitoring the temperature of the roller assembly by means of temperature sensors.

The monitoring device according to WO 735 has a roller assembly that includes a fixed roller component and a bearing bushing. An opening is formed in the fixed roller component. A first sensor is disposed in the opening of the fixed roller component above the bearing bushing. The first sensor is configured to sense a first physical property of the bearing bushing. The fixed roller component is configured as a shaft or housing. The first sensor is a temperature sensor or a Hall effect sensor. A magnet is disposed on the roller assembly. A second sensor is disposed in the opening of the fixed roller component above the bearing bushing. The second sensor is configured to sense a second physical property of the bearing bushing. A data transmission device is coupled to the first sensor. Data is collected from the sensor. Data collected by the sensor is transmitted to a receiving device.

With regard to the further processing of the measured data, the following is described in WO 735: The temperature sensor and the Hall effect sensor generate output signals or output data in the monitoring device. The output signals or data from the monitoring device are transmitted to an external receiving device that outputs the signals or data. A transmitter or connection port is used to transmit the output signals or data from the monitoring device to an external receiving device, such as a computer. The transmitted data can then be uploaded to a computer or other device that processes the data.

The data from the monitoring device is used to monitor the operational status of the roller assembly. For example, when the monitoring device 58 measures the temperature in the end caps 52 and 54 and the thickness of the bushing 56, the monitoring device generates output signals or data that are transmitted to a computer via a wireless transmitter. Alternatively, the output data is accessed via a port connected to the monitoring device 58. The output data is processed and is used to determine if the roller assembly 50 is operating at the correct temperature and bearing bushing thickness. If the data indicates a problem with the roller assembly 50, the problem can be identified immediately. For example, if the temperature data indicates that the roller assembly has reached an abnormally high temperature, a manual or automatic alarm is triggered. For example, a person may monitor the data and call the equipment operator if a roller assembly within the chassis reaches a certain temperature or becomes too hot. Alternatively, the computer contains an algorithm that automatically triggers an alert to the equipment operator when a roller assembly reaches a certain temperature. When the Hall effect reaches a certain voltage and indicates critical bearing bushing wear, a manual or automatic alert is triggered. Therefore, the monitoring device 58 provides real-time feedback on the temperature and bearing bushing thickness of the roller assemblies 50.

A disadvantage of the running gear monitoring device known from WO 735 is that the fixed roller component must have specially adapted openings to accommodate the sensors, and that the sensors interact directly with the bearing bushing to record usable temperature readings. As a result, the solution known from WO 735 cannot be easily retrofitted to existing tracked vehicles without a running gear monitoring device. In addition, the known solution is also costly to implement for equipping new vehicles because several components have to be machined and adapted to each other in order to integrate the solution into the tracked vehicle's running gear.

Thus a need exists to provide a device for monitoring the lubrication condition of the bearing of a track roller of a running gear of a tracked vehicle by means of temperature monitoring, with which both existing tracked vehicles can be retrofitted and new vehicles can be equipped in a simple and cost-effective manner.

According to the disclosure, it was recognized that the fastening screw, with which the bearing journal of the track roller is fastened to an element of the frame of the tracked vehicle, can be used as a carrier element for both the temperature sensor and the RFID transponder of the sensor arrangement. This makes it very easy to retrofit existing tracked vehicles that do not have temperature monitoring devices with temperature monitoring devices according to the present disclosure. Likewise, it is very easy to equip new vehicles with a temperature monitoring device.

According to the disclosure, no specific modifications need to be made to the housing accommodating the bearing journal of the track roller. In particular, no openings need to be provided to accommodate the temperature sensor in the housing accommodating the bearing journal of the track roller. According to the disclosure, all components required for temperature monitoring are carried by the mounting screw. It is therefore sufficient according to the disclosure to provide a fastening screw equipped with these components.

Retrofitting existing tracked vehicles with a temperature monitoring device according to the disclosure can be done, for example, simply by replacing the original fastening screw with a fastening screw that carries the temperature sensor and the RFID transponder.

Equipping new vehicles with the device according to the disclosure is comparably simple. The existing design of the track roller, of the housing accommodating the bearing journal of the track roller and the known mounting of the track roller on the vehicle frame do not need to be modified. It is sufficient to provide a fastening screw designed according to the disclosure, i.e. which carries the temperature sensor and the RFID transponder, as the fastening screw.

In the disclosure, sensor arrangements that are readily and inexpensively available on the market can be used. In these sensor arrangements, the temperature sensor and the RFID transponder can, for example, be arranged together as a modular unit in a single housing.

Retrofitting temperature monitoring devices to existing tracked vehicles and integrating such devices into new vehicles is thus made easy and inexpensive with the disclosure for several reasons:

1. No components of the tracked vehicle chassis need to be structurally modified. Replacing the previous fastening screw with a fastening screw according to the disclosure that carries the sensor arrangement is sufficient to measure and record the temperature data required for temperature and wear monitoring.

2) The reader for reading the temperature data from the RFID transponder is independent of the sensor arrangement and can be attached to the tracked vehicle at a suitable location. For example, the reader can be located at a suitable reading distance from the RFID transponder on a component of the vehicle frame.

3) The further processing device is both independent of the sensor arrangement and independent of the reader device. The further processing device may be, for example, a portable device such as a smartphone, a portable computer like a tablet or the like. For new vehicles, the further processing device may be integrated into the display and instrument panel in the cockpit or driver's cabin of the tracked vehicle. For existing vehicles, the further processing device can be installed as a separate device subsequently in the cockpit or driver's cabin of the vehicle.

According to one embodiment of the disclosure, it is provided that the fastening screw has a screw head, wherein the RFID transponder is disposed at the screw head. In this embodiment, the fastening screw itself does not have to be structurally modified. The RFID transponder can be glued to the screw head, for example. Alternatively, the RFID transponder can also be screwed or otherwise mechanically attached to the screw head. In another alternative, the RFID transponder can be soldered or welded to the screw head.

According to one embodiment of the disclosure, it is provided that the screw head of the fastening screw has a recess in which at least the RFID transponder is arranged. By arranging the RFID transponder in a recess in the head of the fastening screw, the RFID transponder is accommodated in a protected manner. It can therefore not be damaged so quickly in the harsh operating environment in which tracked vehicles, such as construction vehicles in particular, are used.

According to one embodiment of the disclosure, it is provided that the fastening screw has a longitudinal bore in which at least a part of the sensor arrangement, in particular the temperature sensor, is arranged. By arranging the temperature sensor in a longitudinal bore of the fastening screw, the accuracy of the temperature measurement can be increased because the sensor is arranged closer to the bearing components in relation to which the supply of lubricant is to be monitored and on which signs of wear occur in the event of an undersupply of lubricant, than if there were no longitudinal bore for inserting the temperature sensor.

According to one embodiment of the disclosure, it is provided that the longitudinal bore is formed as a through bore, wherein the temperature sensor is disposed at the end of the through bore spaced from the screw head. By this arrangement, the accuracy of the temperature measurement can be further increased, because the sensor is arranged even closer to the bearing components with respect to which the supply of lubricant is to be monitored and at which signs of wear occur in the event of an undersupply of lubricant.

According to one embodiment of the disclosure, it is provided that the reader is configured as a radio frequency antenna.

According to one embodiment of the disclosure, the sensor arrangement is designed as an active sensor arrangement with an energy source or an energy harvesting system and the RFID transponder can be supplied with energy by the energy source or the energy harvesting system. Due to their own energy source, such sensor arrangements work very reliably. Dropouts when reading out the measurement data rarely occur.

According to one embodiment of the disclosure, it is provided that the sensor arrangement is configured as a passive sensor arrangement without its own energy source, wherein the reader has an energy source and the sensor arrangement is configured to be excitable by the reader. In this embodiment, the sensor arrangement is designed to be very low-maintenance, robust and not very susceptible to faults. When the energy source is arranged on the reader, it can be replaced or maintained more easily than when the energy source is arranged on the sensor arrangement, because the reader can often be arranged in a more accessible location on the tracked vehicle than the sensor arrangements. If one reader is configured to read the measurement data of several sensor arrangements of several track rollers, then the maintenance requirement and the effort to replace the energy source is also reduced compared to a device in which each respective sensor arrangement comprises the energy source.

According to one embodiment of the disclosure, it is provided that the temperature sensor is designed as a thermocouple. This makes the sensor arrangement robust and less susceptible to failure, and therefore well suited for use in a harsh and dirty operating environment. Thermocouples are also inexpensive and readily available on the market.

Thus a need exists to provide a method for monitoring the lubrication condition of the bearing of a track roller of a running gear of a tracked vehicle by means of temperature monitoring, which can be used in a simple and cost-effective manner both on existing tracked vehicles and on new vehicles.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
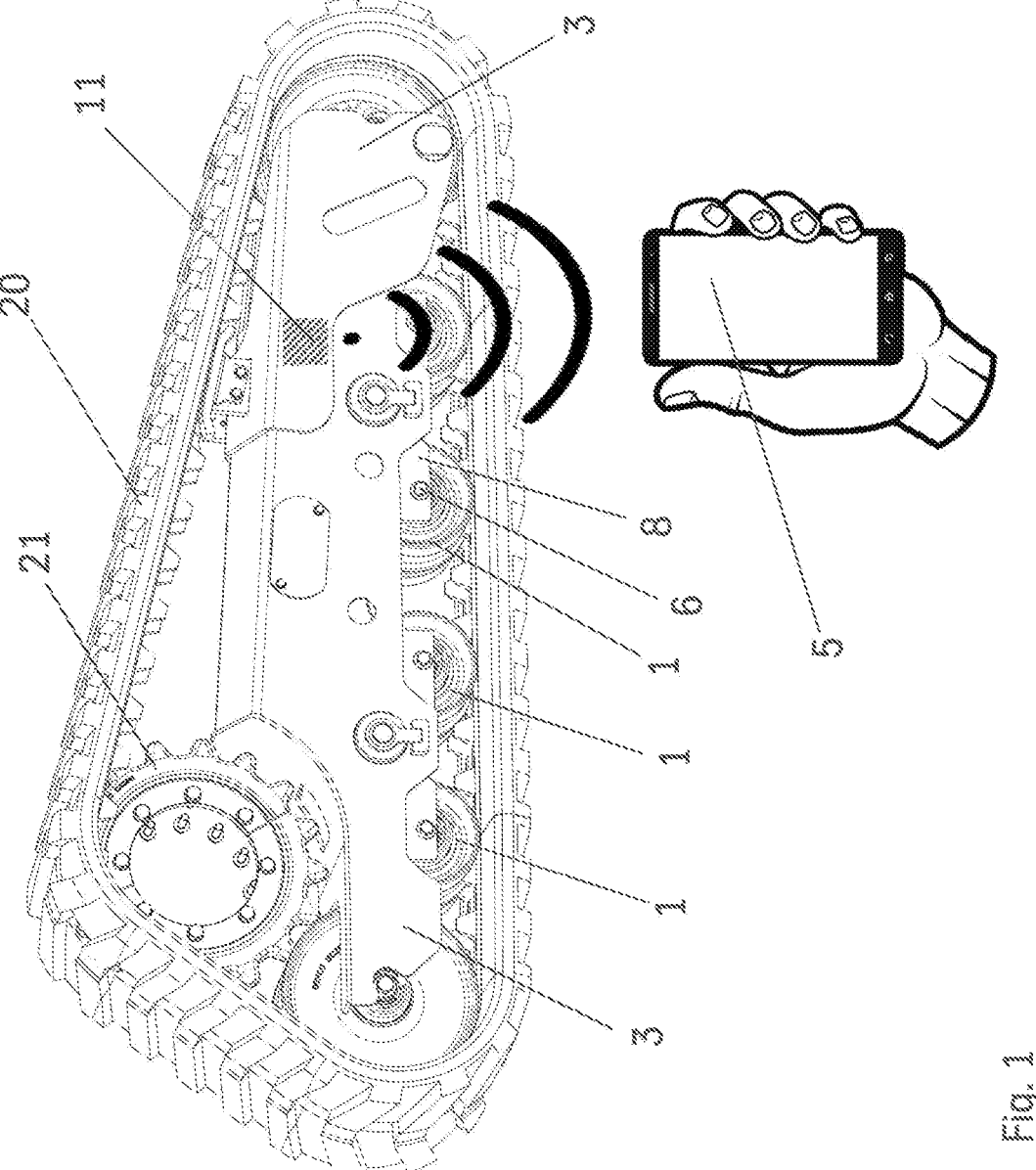
FIG. 1 shows an exterior side view of a section of a tracked vehicle chassis with the device according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

With regard to the method, the disclosure exploits the knowledge that sufficiently accurate temperature measurements can be carried out with a sensor arrangement arranged on the fastening screw for fastening the track roller to the vehicle frame, which allow sufficient conclusions to be drawn about the lubricant supply to the bearing of the track rollers in the running gear of the tracked vehicle. This makes it unnecessary to provide the temperature sensors as close as possible to the bearing journals, so that special openings can be dispensed with in which the temperature sensors are arranged as directly as possible next to or above the bearing journal or the bearing bushing of the track roller.

According to one embodiment of the method according to the disclosure, it is provided that the RFID transponder is disposed on a free end of the fastening screw and the reader is disposed on the frame. This allows the temperature monitoring device according to the disclosure to be installed easily and quickly.

According to one embodiment of the method according to the disclosure, it is provided that the fastening screw comprises a longitudinal bore, wherein the temperature data is sensed by a temperature sensor disposed at least partially in the longitudinal bore. In this way, the accuracy of the temperature measurement can be increased because the temperature sensor can be arranged close to the bearing components in relation to which the supply of lubricant is to be monitored and on which signs of wear occur in the event of an undersupply of lubricant.

If the longitudinal bore is designed as a through-hole and the temperature sensor measures the temperature data at the end of the through-hole spaced from the free end of the fastening screw, the measurement accuracy is increased even further compared to a solution where the temperature sensor is arranged in a longitudinal bore designed as a blind hole.

According to one embodiment of the method according to the disclosure, it is provided that the sensor arrangement is designed as an active sensor arrangement with an energy source or an energy harvesting system and the RFID transponder is supplied with energy by the energy source or the energy harvesting system. Such a method works very reliably and is not very susceptible to faults.

According to one embodiment of the method according to the disclosure, it is provided that the sensor arrangement is configured as a passive sensor arrangement without its own energy source, wherein the reader comprises an energy source and the sensor arrangement is excited by the reader. A method designed in this way operates very reliably and is not very susceptible to faults. Because the energy source is arranged on the reader, it can be replaced or maintained more easily than if the energy source is arranged on the respective sensor arrangement. The reader can often be located in a more accessible location on the tracked vehicle than the sensor arrangements. Furthermore, if one reader is configured to read the measurement data of several sensor arrangements, then the maintenance requirement and the effort for replacing the energy source is also reduced compared to a device in which the respective sensor arrangement comprises the energy source.

FIG. 1 shows a part of a tracked vehicle undercarriage in a side view from the outside. The illustrated part of the running gear includes elements 8 of the vehicle frame 3, track rollers 1 attached to the vehicle frame 3, and the track chain 20 running on the track rollers 1. The track chain 20 is driven by the drive roller 21. In the view from the outside shown in FIG. 1, the track rollers 1 have bearing journals 2 that cannot be seen in more detail in FIG. 1 (see FIG. 2). The track rollers 1 are fastened to elements 8 of the vehicle frame 3 by means of fastening screws 6. The reader 11 for reading out the temperature measurement data captured by the RFID transponder (not shown in FIG. 1) is attached to the vehicle frame 3. The distance between the reader 11 and the RFID transponders 10 arranged on the fastening screws 6 is selected so that even with respect to the fastening screw 6 furthest away from the reader 11, the maximum permissible distance for trouble-free reading of the measurement data is not exceeded.

The reader 11 transmits the temperature data wirelessly to a further processing device. The further processing device 5 shown in FIG. 1 as an example is a smartphone.

Figure 2:
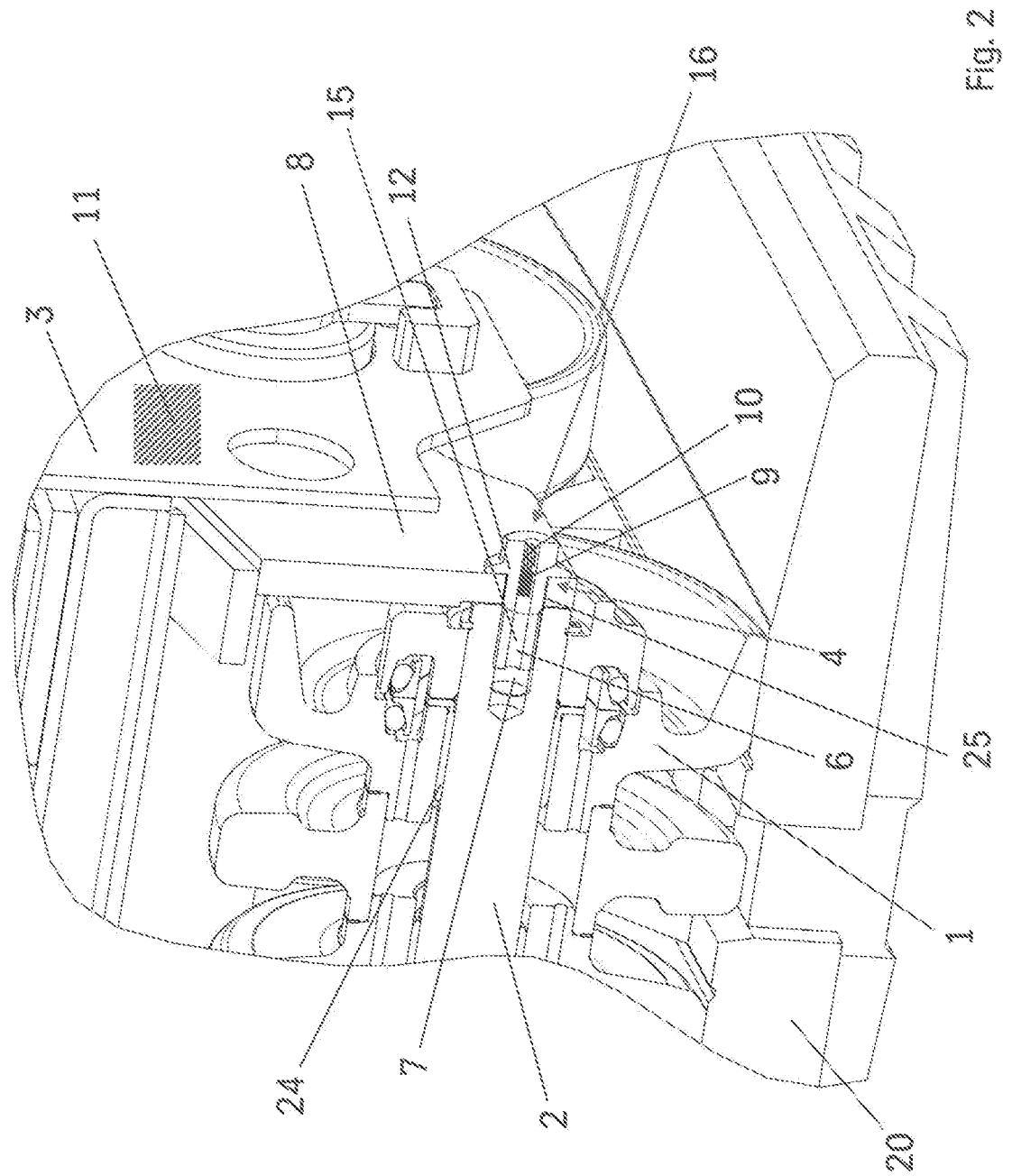
FIG. 2 shows a sectional view of a track roller of a device according to FIG. 1 attached to the vehicle frame.

FIG. 2 shows a sectional view of a track roller 1 of the running gear of a tracked vehicle in a perspective view from the outside. The track roller 1 has a central shaft that includes an end bearing journal 2. The end bearing journal 2 has a threaded bore 7 aligned with a through bore 25 disposed in an element 8 of the vehicle frame 3. The bearing journal 2 is connected to the element 8 of the vehicle frame 3 via the fastening screw 6.

The bearing journal 2 is supported by a sleeve bearing 24.

The fastening screw 6 has a through bore 15. The fastening screw 6 carries a sensor arrangement 4 that comprises a temperature sensor 9 and an RFID transponder 10. The temperature sensor 9 is arranged in the through bore 15. The RFID transponder 10 is also arranged in the through bore 15 of the fastening screw 6. The temperature sensor 9 is arranged closer to the center of the vehicle and closer to the bearing point over which the track roller 1 is supported on the bearing journal 2 than the RFID transponder 10.

Instead of the through bore 15 shown in FIG. 2, a blind hole could also be provided in the fastening screw 6 according to an alternative embodiment.

Figures 5, 6:
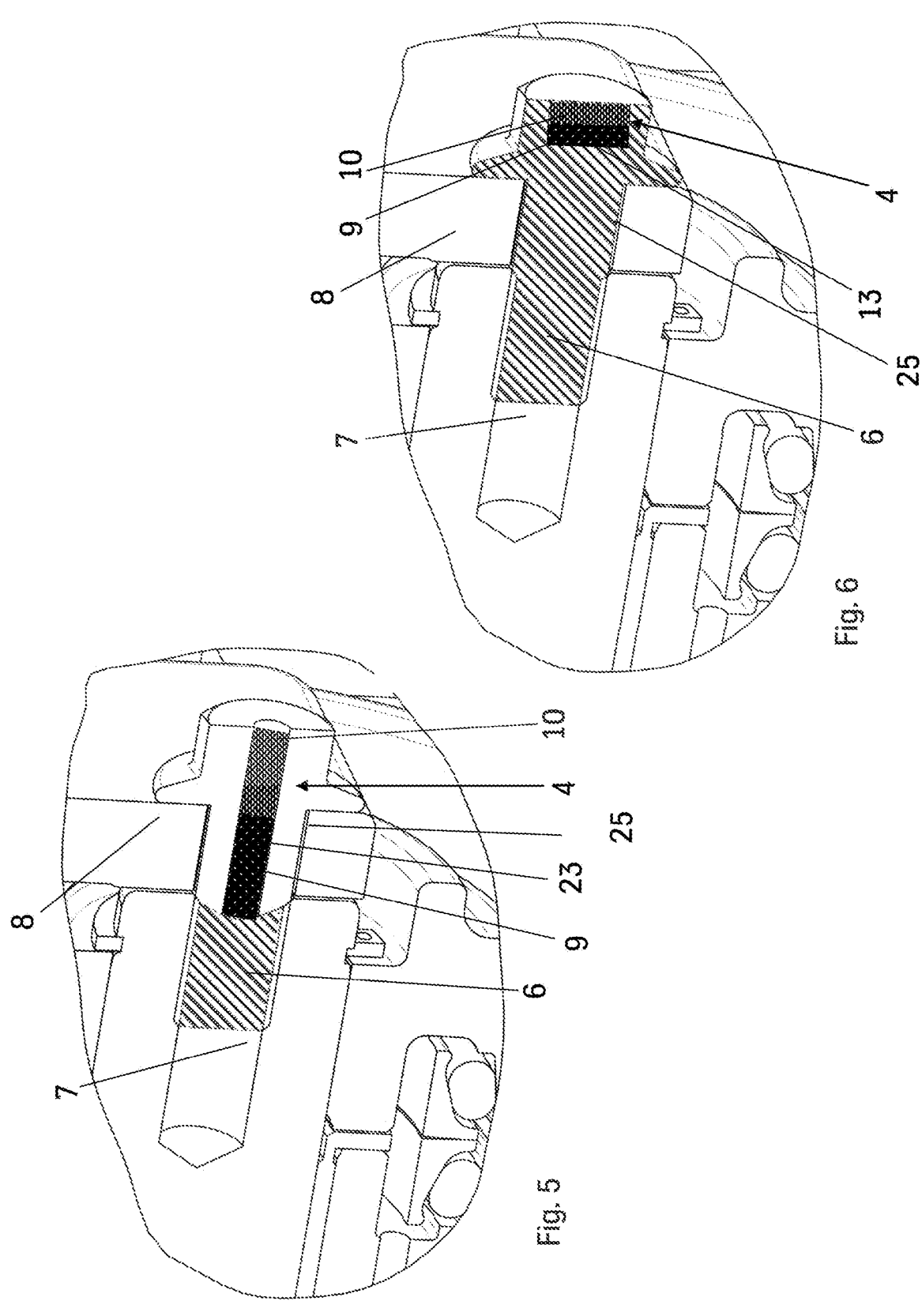
FIG. 5 shows detailed view of an embodiment of the fastening screw for a device according to FIGS. 1 and 2, wherein the fastening screw carries a temperature sensor and an RFID transponder.
FIG. 6 shows detailed view of an embodiment of the fastening screw for a device according to FIGS. 1 and 2, wherein the fastening screw carries a temperature sensor and an RFID transponder.

According to another alternative embodiment, the entire sensor arrangement 4 comprising the temperature sensor 9 and the RFID transponder 10 could be arranged in a recess 13 arranged exclusively in the screw head 12 of the fastening screw 6 (see FIG. 6). In this embodiment, an advantage is that the shank of the fastening screw 6 can be designed as a solid screw bolt that does not have a hole and is therefore mechanically more resilient than a fastening screw 6 whose screw shank has a through-hole or blind hole.

In the embodiment of the disclosure shown in FIG. 2, the RFID transponder 10 is arranged in the area of the screw head 12 of the fastening screw 6, so that it is arranged as close as possible to the reader 11. The reader 11 is fastened to the vehicle frame 3. In the embodiment shown, the reader 11 is designed as a high-frequency antenna and has its own power supply by means of a battery (not shown).

Figures 3, 4:
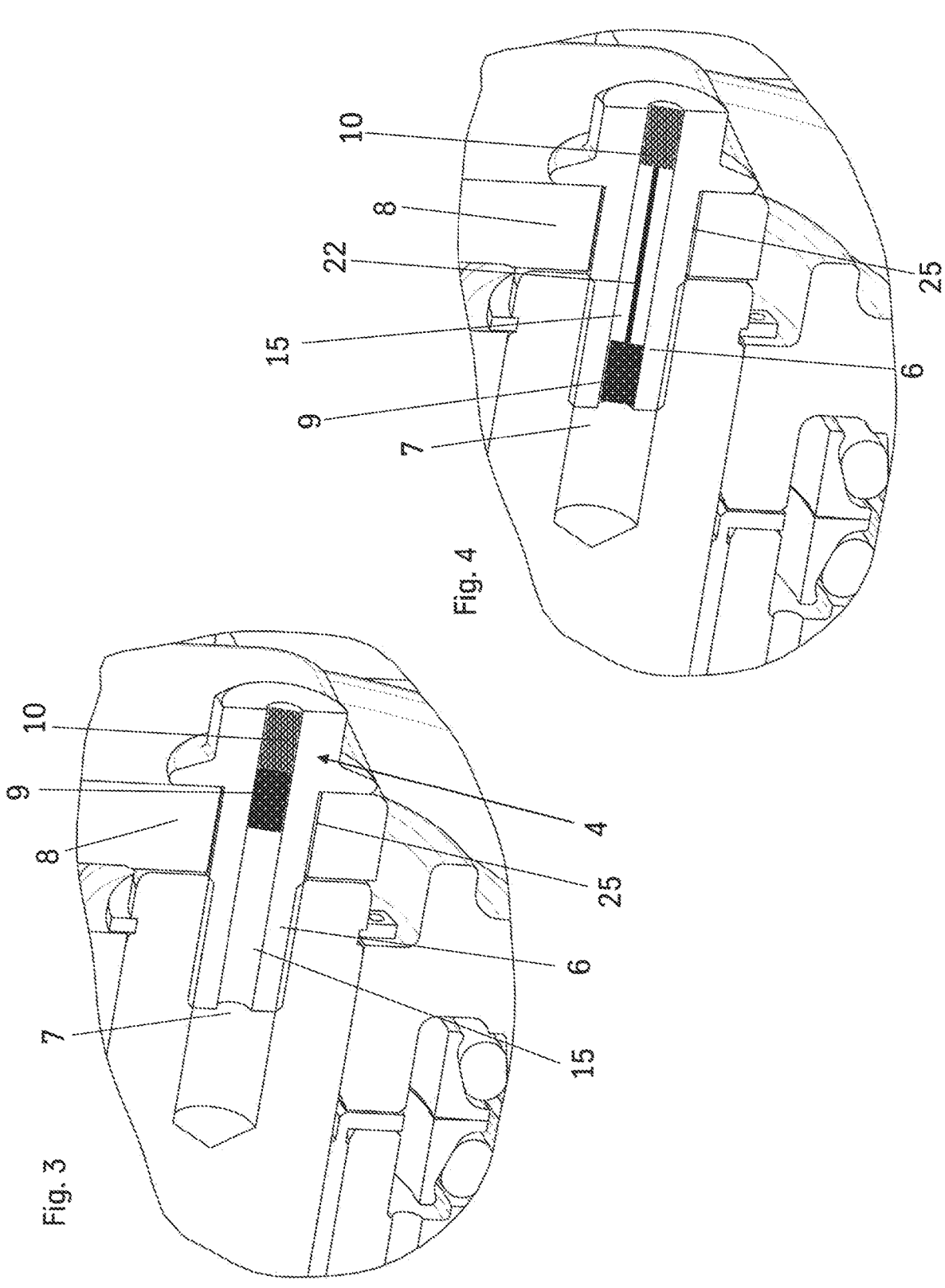
FIG. 3 shows a detailed view of an embodiment of the fastening screw for a device according to FIGS. 1 and 2, wherein the fastening screw carries a temperature sensor and an RFID transponder.
FIG. 4 shows a detailed view of an embodiment of the fastening screw for a device according to FIGS. 1 and 2, wherein the fastening screw carries a temperature sensor and an RFID transponder.

FIG. 3 shows an enlarged view of the fastening screw 6 with the through bore 15 according to FIG. 2. The sensor arrangement 4 with the temperature sensor 9 and the RFID transponder 10 is arranged in the through bore 15. The RFID transponder 10 is arranged at the outer end of the through bore 15. The temperature sensor 9 extends further into the interior of the fastening screw 6. The temperature sensor 9 and the RFID transponder 10 may be arranged in a common housing.

The sensor arrangement 4 according to FIG. 3 is passive. The temperature sensor 9 measures the temperature of the fastening screw 6 at the location where the temperature sensor 9 is located. The measured values are passed on to the RFID transponder 10 and recorded by it. The RFID transponder 10 is excited by the reader 11 (see FIGS. 1 and 2), which reads out the captured temperature values from the RFID transponder 10. The reader 11 transmits the temperature data to a further processing device 5 (see FIG. 1). The further processing device 5 may be a mobile device such as a smartphone or a portable computer such as a tablet. Alternatively, the further processing device 5 may be a computer located in the operator's cabin or cockpit of the tracked vehicle, e.g. integrated into the instrument panel or dashboard of the tracked vehicle, or installed as a separate device in the operator's cabin.

The disclosure makes use of the insight that the temperature data measured by the temperature sensor do not necessarily have to be measured directly on the surface of the bearing element, i.e. directly on the surface of the bearing bushing as in WO 2013/148735 A1, but that it is sufficient to arrange the temperature sensor at a distance from the bearing point at the fastening screw, and to measure the temperature data there.

In order to determine whether a critical temperature has been reached, it can be sufficient to monitor the temperature measured by the temperature sensor 9 over time. If a critical temperature has been reached the vehicle operator can react.

It is also possible to create a correlation table which shows the correlation between the temperatures measured by the temperature sensor 9 in the area of the fastening screw and the temperatures of the bearing journal 2 or the bearing bushing/sleeve bearing 24. Such a correlation table can be created, for example, by simultaneously measuring both the temperature at the location of the temperature sensor 9 and the temperature which is present at the bearing journal 2 or the bearing bushing/sleeve bearing 24, and then comparing both temperature values measured at the same measurement time.

The transmission of data from the reader 11 to the further processing device 5 may be wireless or cabled. The further processing device 5 can be set up to emit a warning signal if the measured temperature values reach or exceed a predefinable limit value. In this way, the tracked vehicle can be subjected to a (e.g. regular) maintenance measure before it breaks down during its operation on a construction site, i.e. before increased repair work and repair costs are incurred.

The advantage of the embodiment according to FIG. 3 is that low-cost sensor arrangements 4 manufactured as mass products can be used. These sensor arrangements 4 are readily available on the market. They can be easily installed and work together with an active reader 11 in a straightforward manner ("plug-and-play").

FIG. 4 shows an embodiment of the disclosure in which the temperature sensor 9 is arranged at the inside end of the through bore 15, while the RFID transponder 10 is arranged at the outside end of the through bore 15. In the illustrated embodiment example, the RFID transponder 10 is arranged at the same location as in the embodiment example according to FIG. 3. The temperature measurement data is transmitted from the temperature sensor 9 to the RFID transponder 10 via a connection 22. This connection 22 can be a wireless data transmission connection, but it can also be a connection cable for a wired transmission of the temperature data.

The advantage of the embodiment according to FIG. 4 is that a more precise temperature measurement is possible than with the arrangement of the temperature sensor 9 according to FIG. 3.

FIG. 5 shows an embodiment of the disclosure in which the fastening screw 6 does not have a through bore, but a blind hole 23. The design and arrangement of the sensor arrangement 4 is comparable to FIG. 3. Due to the design of the hole receiving the sensor arrangement 4 as a blind hole 23, the threaded bolt of the fastening screw 6 is solid, so that the fastening screw 6 can bear greater loads than a fastening screw with a through bore and a threaded bolt of hollow cylindrical design.

FIG. 6 shows an embodiment of the disclosure in which neither a through bore nor a blind hole is provided in the fastening screw 6 to accommodate the sensor arrangement 4. Instead, a recess 13 is provided in the screw head 12 of the fastening screw 6 in which the sensor arrangement 4 is arranged. This recess 13 can be manufactured in the screw head 12, for example, by turning or milling.

This embodiment of the disclosure also has the advantage that inexpensive sensor arrangements 4 manufactured as mass products can be used. These sensor arrangements 4 are readily available on the market. They can be easily installed and work together with an active reader 11 in a straightforward manner ("plug-and-play").

The proposed solution takes advantage of the realization that the temperature readings from the temperature sensor do not necessarily have to be measured directly on the surface of the bearing element, i.e. directly on the surface of the bearing bushing as in WO 2013/148735 A1, but that it is sufficient to arrange the temperature sensor at a distance from the bearing point at the fastening screw, and to measure the temperature data there.

According to one possibility, an existing correlation between the temperatures in the area of the fastening screw and the temperatures in the bearing journal or bearing bushing/sleeve bearing supporting the bearing journal can be taken into account when evaluating the measured temperature values. Such a correlation can be worked out, for example, in tests by simultaneously measuring and comparing both temperature values.

According to another possibility, the development of a temperature trend over time for the temperatures measured by the temperature sensor 9 can be observed as part of the evaluation of the measured temperature values.

LIST OF REFERENCE NUMERALS 1 track roller
2 bearing journal
3 frame
4 sensor arrangement
5 further processing device
6 fastening screw
7 threaded bore
8 element of the frame
9 temperature sensor

10

10 FRID transponder
11 Reade
12 Screw head
13 Recess
14 Longitudinal bore
15 Through bore
16 Free end of fastening screw
20 Track chain
21 Drive roller
22 Connection
23 Blind hole
24 Sleeve bearing
25 Through bore

What is claimed is:

1. A device for monitoring a lubrication condition of a bearing of a track roller of a running gear of a tracked vehicle, the track roller having at least one bearing journal, wherein the track roller is configured to be mounted within a frame of the tracked vehicle via the bearing journal, the device comprising:

a sensor arrangement arranged in a region of the bearing journal, wherein the sensor arrangement is configured to transmit temperature data measured by the sensor arrangement wirelessly to a further processing device, wherein the sensor arrangement is arranged on a fastening screw, wherein the fastening screw is screwed into a threaded bore provided in the bearing journal, wherein the track roller is configured to be fastened to an element of the frame by the fastening screw, wherein the sensor arrangement includes a temperature sensor configured to measure instantaneous temperature data, wherein the sensor arrangement includes an RFID transponder for temperature data acquiring, wherein a reader is provided at a distance from the RFID transponder for reading out the acquired temperature data, and wherein the reader is configured for transmitting the temperature data to the further processing device for further processing.

2. The device of claim 1, wherein the fastening screw comprises a screw head, wherein the RFID transponder is disposed at the screw head.

3. The device of claim 2, wherein the screw head includes a recess in which at least the RFID transponder is arranged.

4. The device of claim 1, wherein the fastening screw includes a longitudinal bore in which at least a part of the sensor arrangement is arranged.

5. The device of claim 4, wherein the longitudinal bore is formed as a through bore, wherein the temperature sensor is disposed at the end of the through bore spaced from the screw head.

6. The device of claim 1, wherein the reader is configured as a radio frequency antenna.

7. The device of claim 1, wherein the sensor arrangement is an active sensor arrangement with an energy source or an energy harvesting system and the RFID transponder can be supplied with energy by the energy source or the energy harvesting system.

8. The device of claim 1, wherein the sensor arrangement is configured as a passive sensor arrangement without its own energy source, wherein the reader has an energy source and the sensor arrangement is configured to be excitable by the reader.

9. The device of claim 1, wherein the temperature sensor is a thermocouple.

10. A method for monitoring a lubrication condition of a bearing of a track roller of a running gear of a tracked vehicle, wherein the temperature monitoring is carried out during operation of the tracked vehicle by a sensor arrangement, wherein the track roller is mounted in a frame of the tracked vehicle via at least one bearing journal, wherein the sensor arrangement is arranged in a region of the bearing journal, wherein the sensor arrangement is arranged on a fastening screw, wherein the fastening screw is screwed into a threaded bore provided in the bearing journal, wherein the track roller is fastened to an element of the frame by the fastening screw, wherein the sensor arrangement comprises a temperature sensor with which instantaneous temperature data are measured, the method comprising:

acquiring a temperature data by the sensor arrangement, wherein the sensor arrangement comprises an RFID transponder with which the temperature data are acquired;

transmitting the temperature data wirelessly to a further processing device;

reading out the acquired temperature data a reader which is arranged at a distance from the RFID transponder; and transmitting the temperature data from the reader to the further processing device for further processing.

11. The method of claim 10, wherein the RFID transponder is disposed on a free end of the fastening screw and the reader is disposed on the frame.

12. The method of claim 10, wherein the fastening screw comprises a longitudinal bore, and wherein the temperature data is sensed by a temperature sensor disposed at least partially in the longitudinal bore.

13. The method of claim 10, wherein the longitudinal bore is configured as a through bore, and wherein the temperature sensor measures temperature data at the end of the through bore spaced from the free end of the fastening screw.

14. The method of claim 10, wherein the sensor arrangement is an active sensor arrangement with an energy source or an energy harvesting system and the RFID transponder is supplied with energy by the energy source or the energy harvesting system.

15. The method of claim 10, wherein the sensor arrangement is configured as a passive sensor arrangement without its own energy source, wherein the reader comprises an energy source and the sensor arrangement is excited by the reader.

* * * * *